United States Patent
Anderson et al.

(10) Patent No.: US 9,950,799 B2
(45) Date of Patent: Apr. 24, 2018

(54) SHIELDED ANTI-ICING SYSTEM AND METHODS

(71) Applicant: HONEYWELL INTERNATIONAL INC., Morris Plains, NJ (US)

(72) Inventors: Morris Anderson, Mesa, AZ (US); Shawn Alstad, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 240 days.

(21) Appl. No.: 15/064,748

(22) Filed: Mar. 9, 2016

(65) Prior Publication Data
US 2017/0259926 A1    Sep. 14, 2017

(51) Int. Cl.
*B64D 15/04*    (2006.01)

(52) U.S. Cl.
CPC .................................. *B64D 15/04* (2013.01)

(58) Field of Classification Search
CPC    B64D 15/04; B64D 2033/0233; B64D 32/02; F02C 7/047; F01D 25/02
See application file for complete search history.

(56) References Cited

U.S. PATENT DOCUMENTS

| | | |
|---|---|---|
| 6,443,395 B1 | 9/2002 | Porte et al. |
| 6,702,233 B1 | 3/2004 | DuPont |
| 2010/0163678 A1 | 7/2010 | Karl et al. |
| 2012/0248250 A1 | 10/2012 | Alain et al. |
| 2015/0198061 A1 | 7/2015 | Johnson et al. |

FOREIGN PATENT DOCUMENTS

| | | |
|---|---|---|
| EP | 0376371 A2 | 7/1990 |
| EP | 2894096 A1 | 7/2015 |

OTHER PUBLICATIONS

Extended EP Search Report for Application No. 17154496.8-1754 dated Jun. 26, 2017.

*Primary Examiner* — Valentina Xavier
(74) *Attorney, Agent, or Firm* — Lorenz & Kopf, LLP

(57) ABSTRACT

An anti-icing system is provided for an inlet lip annularly extending about a nacelle of an aircraft engine assembly. The anti-icing system includes an interior wall structure at least partially forming an annular anti-icing chamber with the inlet lip and an annular shield with a first end coupled to the interior wall structure and a second end extending into the annular anti-icing chamber. The annular shield divides the annular anti-icing chamber into first and second chamber portions fluidly coupled together by a passage formed between the second end and the internal surface of the inlet lip. The anti-icing system further includes a nozzle at an inwardly radial position relative to the first end of the annular shield such that the heated air exits the nozzle into the first chamber portion in which the annular shield blocks direct impingement on the internal surface of the inlet lip.

20 Claims, 4 Drawing Sheets

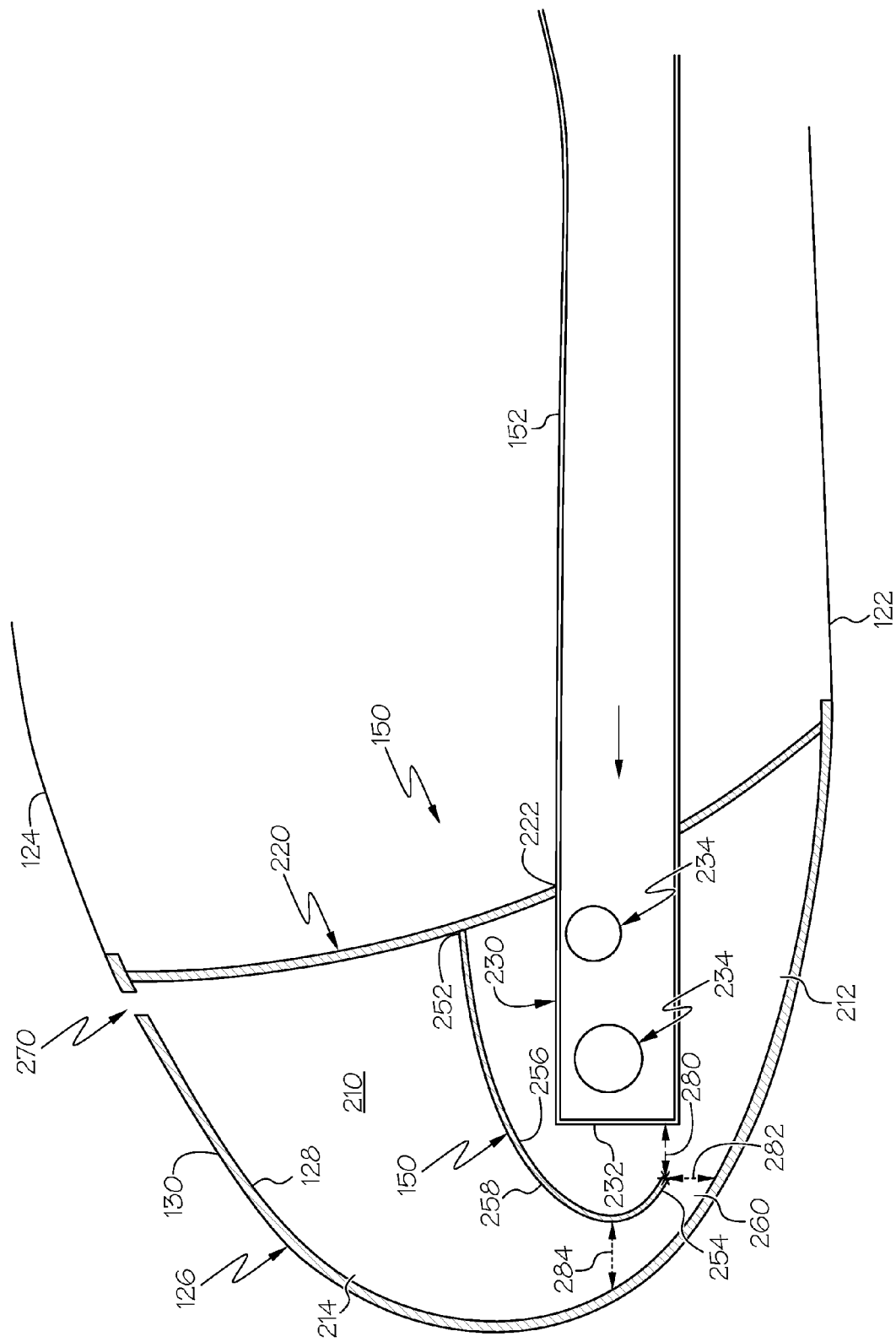

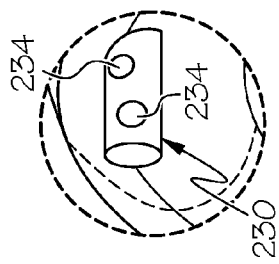
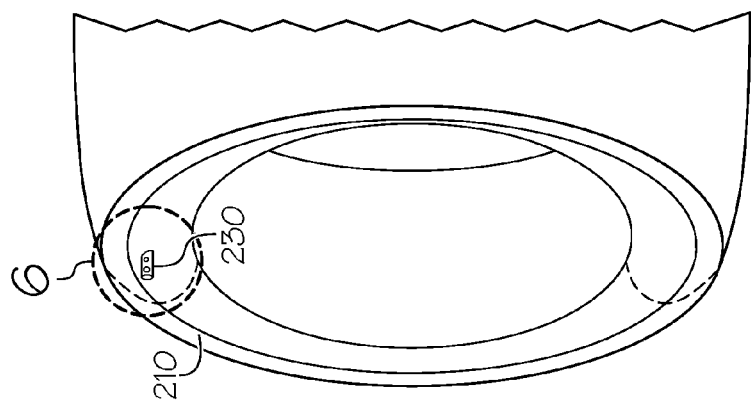
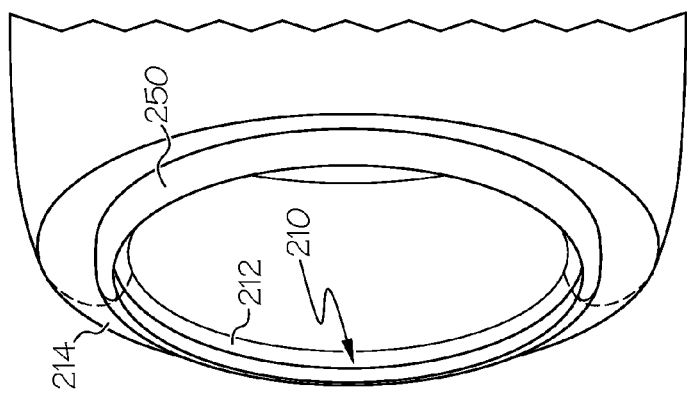
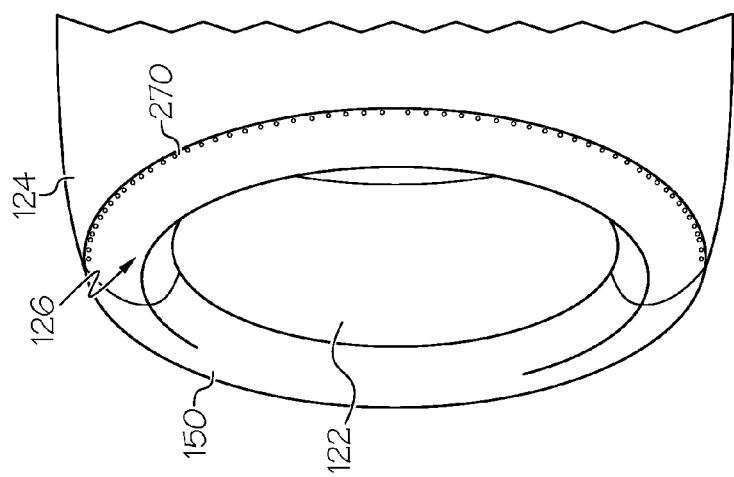

US 9,950,799 B2

SHIELDED ANTI-ICING SYSTEM AND METHODS

TECHNICAL FIELD

The present invention generally relates to aircraft systems and methods, and more particularly relates to anti-icing systems and methods for aircraft engine assemblies.

BACKGROUND

Aircraft operate in many different types of weather and conditions, including icing conditions. Ice that forms on the leading edge of a nacelle that houses an aircraft engine may break off and enter the engine, potentially resulting in undesirable issues. In addition it may adversely affect air flow into the engine, potentially resulting in reduced performance and/or negatively impacting operating margins of the aircraft. Anti-icing systems have been developed to address ice formation. Although these conventional anti-icing systems have been effective, challenges remain, particularly with respect to air flow efficiency, asymmetric or uneven heating, localized hot spots, weight, complexity, and cost.

Accordingly, it is desirable to provide improved anti-icing systems and methods. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an anti-icing system is provided for an inlet lip annularly extending about a nacelle of an aircraft engine assembly. The anti-icing system includes an interior wall structure at least partially forming an annular anti-icing chamber with an internal surface of the inlet lip and an annular shield with a first end coupled to the interior wall structure and a second end extending into the annular anti-icing chamber. The annular shield divides the annular anti-icing chamber into a first chamber portion and a second chamber portion such that the first and second chamber portions are fluidly coupled together by a passage formed between the second end and the internal surface of the inlet lip. The anti-icing system further includes a nozzle configured to be coupled to a source of heated air and extending through the interior wall at an inwardly radial position relative to the first end of the annular shield such that the heated air exits the nozzle into the first chamber portion in which the annular shield blocks direct impingement by the heated air on the internal surface of the inlet lip.

In accordance with an exemplary embodiment, an engine assembly includes an engine; a nacelle housing the engine and having a leading portion formed by an inlet lip; and an anti-icing system configured to direct air from the engine to the inlet lip for anti-icing the inlet lip. The anti-icing system includes an interior wall structure at least partially forming an annular anti-icing chamber with an internal surface of the inlet lip; an annular shield with a first end coupled to the interior wall structure and a second end extending into the annular anti-icing chamber, the annular shield dividing the annular anti-icing chamber into a first chamber portion and a second chamber portion, the first and second chamber portions being fluidly coupled together by a passage formed between the second end and the internal surface of the inlet lip; and a nozzle configured to be coupled to a source of heated air and extending through the interior wall at an inwardly radial position relative to the first end of the annular shield such that the heated air exits the nozzle into the first chamber portion in which the annular shield blocks direct impingement by the heated air on the internal surface of the inlet lip.

BRIEF DESCRIPTION OF THE DRAWINGS

The present invention will hereinafter be described in conjunction with the following drawing figures, wherein like numerals denote like elements.

FIG. 2 is a partial cross-sectional view of an anti-icing system of the aircraft engine assembly of FIG. 1 in accordance with an exemplary embodiment;

FIG. 3 is a front outer isometric view of an inlet lip incorporating the anti-icing system of FIG. 2 in accordance with an exemplary embodiment;

FIGS. 4 and 5 are isometric views of aspects of the anti-icing system of FIG. 2 in accordance with an exemplary embodiment;

FIG. 6 is a more detailed view of a swirl nozzle of the anti-icing system of FIG. 2 in accordance with an exemplary embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments disclosed herein provide anti-icing systems and methods in which heated air flow is delivered by a nozzle into a chamber formed within an inlet lip of an engine assembly. In particular, exemplary embodiments include a shield within the chamber that functions to prevent the heated air exiting the nozzle from directly impinging onto the inner surface of the inlet lip. In effect, the shield divides the chamber into first and second portions to ensure proper mixing and temperature uniformity in heating the inlet lip.

Figure 1:
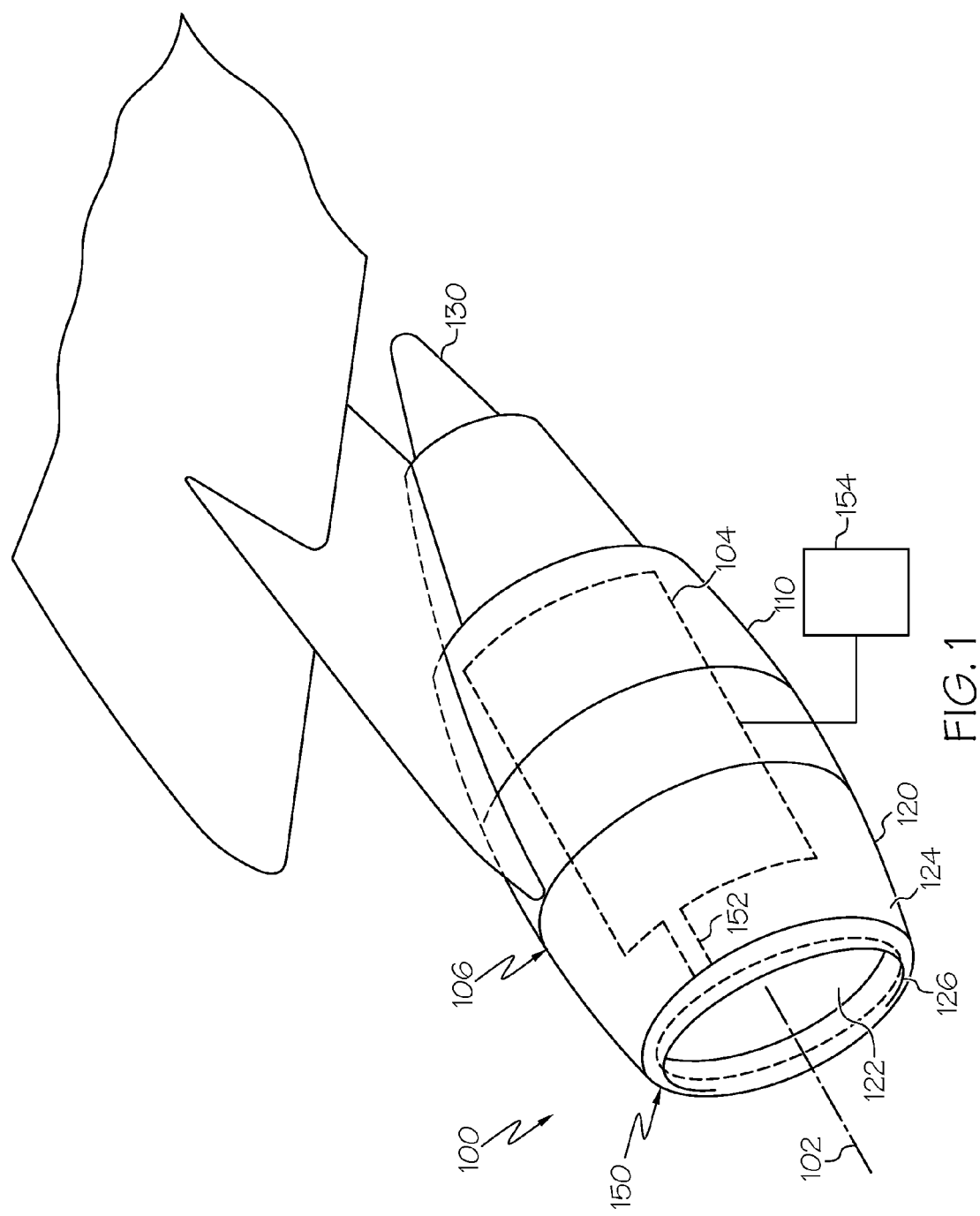
FIG. 1 is a partial schematic representation of an aircraft engine assembly in accordance with an exemplary embodiment.

FIG. 1 is a partial schematic representation of an aircraft engine assembly 100 in accordance with an exemplary embodiment. As shown, the aircraft engine assembly 100 is generally mounted on an aircraft, such as on an aircraft wing or on an aircraft fuselage. In the description below, the aircraft engine assembly 100 may be described with respect to an annular or cylindrical coordinate system with radial, axial, and tangential orientations relative to a centerline 102.

However, it is noted that aspects of the engine or the overall engine assembly 100 may not be axisymmetric.

The aircraft engine assembly 100 includes an engine 104 (schematically shown) housed in a nacelle 106. The nacelle 106 has an annular shape and may be formed by a number of sections or components, including a cowl section 110, an inlet cowl section 120, and an exhaust cowl section 130. The inlet cowl section 120 may be formed by an inner section 122, an outer section 124, and an inlet lip 126. The outer section 124 circumscribes the inner section 122, and the inlet lip 126 joins the inner section 122 to the outer section 124 to form the leading edge of the aircraft engine assembly 100. Generally, the inlet cowl section 120 defines an inlet opening for directing air into the engine 104. At least a portion of the air entering the assembly 100 is combusted by the engine 104 to convert a portion of the energy from the fuel to rotational energy, causing the turbine to rotate, which forces air through the engine. The resulting products are forcibly exhausted through an exhaust opening(s) at least partially defined by the exhaust cowl section 130. The force associated with this exhausted gas is called thrust.

As shown, the inlet lip 126 is the leading edge of the engine assembly 100. During some weather or operating conditions, ice has the tendency to form and accumulate on the inlet lip 126 and, if unaddressed, may cause undesirable issues. As such, an anti-icing system 150 may be incorporated into the aircraft engine assembly 100 to prevent formation of ice or to remove formed ice (collectively referenced below as "anti-icing") from the inlet lip 126.

As described in greater detail below, the anti-icing system 150 circulates heated air in a manner that increases the temperature of portions of the inlet lip 126 that may otherwise be susceptible to icing. The heated air may be provided to the anti-icing system 150 from the engine 104 via a conduit 152, typically as bleed air from a particular stage of the compressor. In one exemplary embodiment, operation of the anti-icing system 150 may be controlled by a controller 154 based on weather conditions, operating conditions, and/or operator commands as a stand-alone system or as part of a larger aircraft safety system. Although not shown, other components, such as flow valves and conduits, may also be incorporated into the aircraft engine assembly 100 to facilitate efficient and effective operation of the anti-icing system 150. The structure and operation of the anti-icing system 150 will be described below in greater detail.

Figure 7:
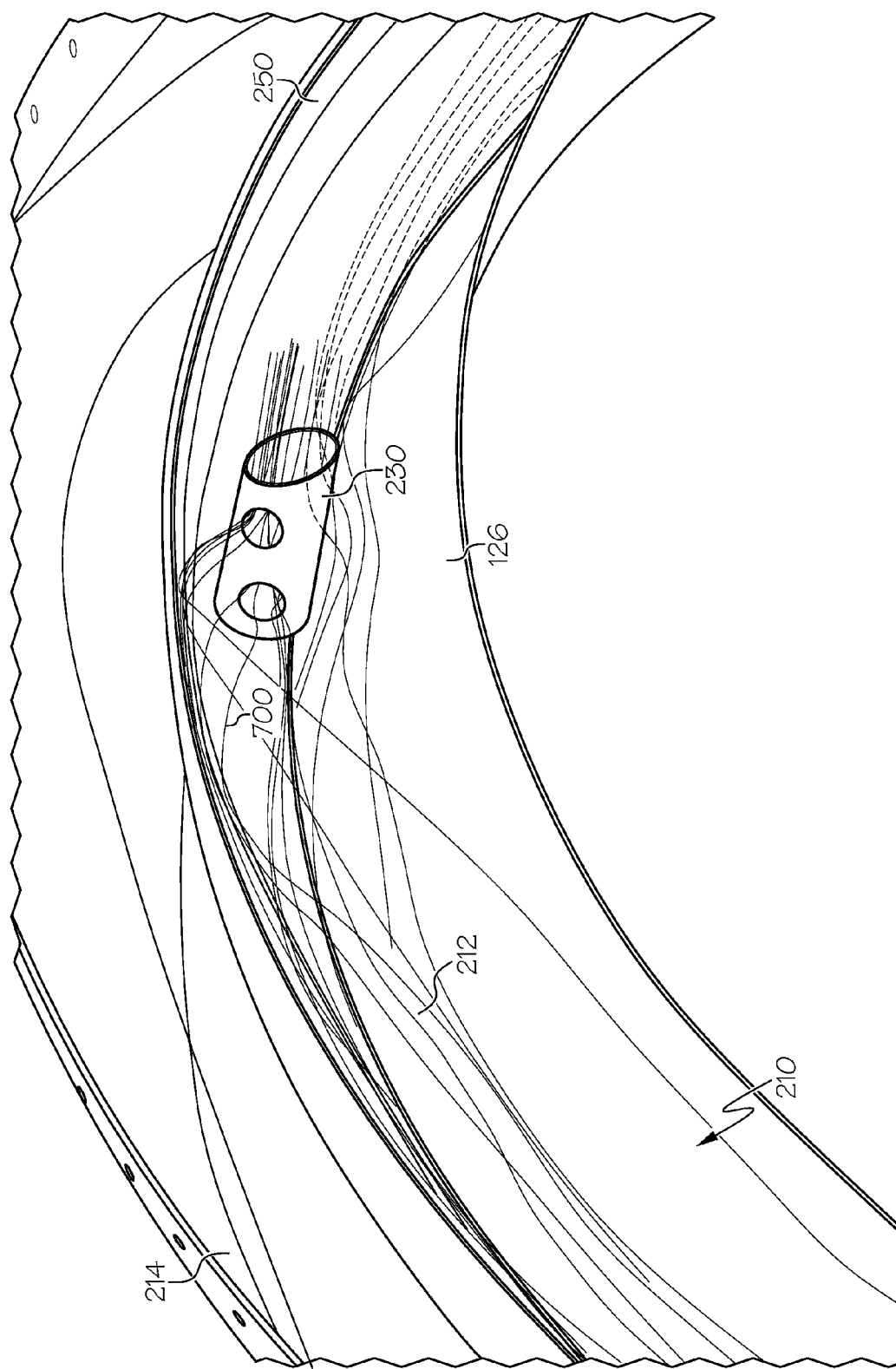
FIG. 7 is a schematic view depicting exemplary streamlines of air flow of the anti-icing system of FIG. 2 in accordance with an exemplary embodiment.

FIGS. 2-7 depict various views of the anti-icing system 150 in accordance with an exemplary embodiment. In particular, FIG. 2 is a cross-sectional view of the anti-icing system 150 in the axial-radial plane. FIGS. 3-6 are front isometric views of aspects of the anti-icing system 150 with some components removed for clarity. FIG. 7 is a partial rear isometric view depicting streamlines of air flow in the anti-icing system 150 during operation. Each will be described in greater detail below.

Initially referring to FIG. 2 and as noted above, the inlet lip 126 is a curved leading edge structure that couples the inner section 122 to the outer section 124 of the inlet cowl section 120. The anti-icing system 150 functions to deliver heated air flow into an anti-icing chamber 210 at least partially formed by an interior surface 128 of the inlet lip 126 to prevent or remove ice from forming on an exterior surface 130 of the inlet lip 126.

The anti-icing system 150 may be considered to include an aft (or internal) wall structure 220 that at least partially defines the anti-icing chamber (or inlet lip skin) 210 within the inlet cowl section 120. As shown, the aft wall structure 220 extends in a generally radial direction between the edges of the curved inlet lip 126, although in other embodiments, the aft wall structure 220 may extend between the inner and outer sections 122, 124 or between the one end of the inlet lip 126 and the opposing inner or outer section 122, 124. The inlet lip 126 and wall structure 220 (and the resulting chamber 210) may be arranged and dimensioned with consideration for a number of factors, including the anti-icing function discussed below, as well as engine operation and performance characteristics. As examples, the highlight, or leading edge diameter, of the inlet lip 126 is sized to allow the appropriate amount of air into the engine 104 given the fan diameter size. The length of the inlet lip 126 and engine cowl section 120 may be sized for a certain amount of acoustic treatment. The shape of the inlet lip 126 may also be a function of aerodynamic and manufacturing considerations. Generally, the surface areas of the inlet lip 126 that may be protected from icing are based on the operational characteristics of the aircraft and the engine 104. Although FIG. 2 depicts the aft wall structure 220 as a single wall, the aft wall structure 220 may be formed by any number of components that function to define the chamber 210.

Considering the cross-sectional shape, the chamber 210 may be referred to as a D-shaped chamber or D-shaped duct. FIG. 3 is an exterior view of the inlet lip 126 that depicts the annular nature of the inlet lip 126, and FIG. 4 is a similar view to FIG. 3, except that the inlet lip 126 has been removed to additionally show the corresponding annular nature of the chamber 210.

Again referring to FIG. 2, the anti-icing system 150 further includes a nozzle 230 coupled to the conduit 152 for delivering heated air flow into the chamber 210. As such, the nozzle 230 or conduit 152 extends through an opening 222 defined in the aft wall structure 220. The nozzle 230 generally has an elongated cylindrical wall structure with an approximately axial orientation. In one exemplary embodiment, the axial end 232 of the nozzle 230 is capped or otherwise closed, and the nozzle 230 has one or more nozzle openings 234 defined in the cylindrical wall such that the heated air exits the nozzle 230 and flows into the chamber 210. In one exemplary embodiment, two openings 234 are arranged on the nozzle 230, although additional holes or only a single hole may be provided.

The nozzle openings 234 may have any suitable orientation. As shown in the depicted exemplary embodiment, the nozzle openings 234 may be positioned along the axial length of the nozzle 230 and clocked or offset with respect to the tangential and/or radial orientations such that the heated air is subject to the desired flow characteristics within the chamber 210, as discussed in greater detail below. In one exemplary embodiment, the nozzle openings 234 are positioned on one tangential side of the nozzle 230, either entirely tangential or with an outwardly radial component to encourage a swirling annular air flow in a designated direction around the chamber 210. In other words, an entirely tangential orientation would be considered to have an angle of 0° relative to a tangential axis. In some embodiments, one or more of the openings 234 may be offset relative to the tangential axis with a radial component. In one exemplary embodiment, a combination of openings 234 with various orientations may be used, including an embodiment with a first opening 234 of 0° relative to the tangential axis, a second opening 234 of 10°-30° relative to the tangential axis, and a third opening 234 of more than 30° relative to the tangential axis. In further embodiments, the openings 234 may have angles of greater than 90°, including 180° or greater. Additionally, the openings 234 may have different sizes. FIG. 5 depicts the position of the nozzle 230 relative to the chamber 210, and FIG. 6 is a more detailed view of the nozzle 230 and nozzle openings 234, as described in greater detail below.

The anti-icing system 150 further includes a shield 250 with a first end 252 coupled to the aft wall structure 220 and a second end 254 extending into the chamber 210. Like the aft wall structure 220 and the inlet lip 126, the shield 250 has an annular structure extending about the engine assembly centerline 102, as best shown in FIG. 4. As best shown in the exemplary embodiment of FIG. 2, the shield 250 may have a curved structure (or C-shape) in which the second end 254 terminates in the chamber 210, unattached to the inlet lip 126 or aft wall structure 220.

The shield 250 functions to divide the chamber 210 into a first chamber portion 212 and a second chamber portion 214. The first chamber portion 212 may be considered to include the portions of the chamber 210 between an inner surface 256 of the shield 250 and the aft wall structure 220, and the second chamber portion 214 may be considered to include the portions of the chamber 210 between an outer surface 258 of the shield 250 and the inlet lip 126. Generally, the first chamber portion 212 may be considered relative to the second chamber portion 214 to be positioned rearward in an axial dimension and inward in a radial dimension. The chamber portions 212, 214 are fluidly coupled together by an annular passage or slot 260 extending between the second end 254 of the shield 250 and the inlet lip 126.

The shield 250 and nozzle 230 are positioned such that the heated air exits the nozzle openings 234 into the first chamber portion 212. The shield 250 is positioned and shaped to at least partially surround and/or enclose the nozzle 230. FIGS. 2 and 4 particularly show how the shield 250 curves around the nozzle 230. As a result of this arrangement, the shield 250 prevents any impingement of the heated air directly from the nozzle 230 onto the inlet lip 126. Typically, the heated air flowing into the first chamber portion 212 impinges the inner surface 256 of the shield 250 and has tangential or annular swirling flow characteristics about the first chamber portion 212. As the heated air flows along the first chamber portion 212, some amount of air flows through the passage 260 into the second chamber portion 214. In the second chamber portion 214, the heated air functions to increase the temperature of the inlet lip 126 to prevent and/or mitigate the formation of ice and/or assist in the removal of formed ice. At this point, the heated air has been mixed and/or cooled so as to provide a more uniform and/or effective heating of the inlet lip 126, as discussed below.

The shield 250 may have any suitable shape, position, and dimension to improve the flow characteristics and the overall effectiveness and efficiency of the anti-icing system 150. In one exemplary embodiment, the cross-sectional area (and volume) of the first chamber portion 212 is approximately equal to the cross-sectional area (and volume) of the second chamber portion 214. As further examples, distances 280, 282, 284 may be sized to provide the desired flow characteristics. Generally, the distances 280, 282, 284 and other dimensions are typically defined with CFD analysis. The relative geometric dimensions (e.g., passage 260 to chamber portion 212 size, volume ratio of chamber portion 212 to chamber portion 214, ratio of the swirl nozzle exit area to the chamber portion 212 cross-section area, and the like.). More specific dimensions may depend on the specific engine and application.

As noted above, the shield 250 generally has a curved configuration to partially enclose the nozzle 230, particularly the nozzle openings 234, thereby shielding the inlet lip 126 from direct impingement of the heated air exiting the nozzle openings 234. As a result, the characteristics of the shield 250 may be a function of the characteristics of the nozzle 230, such as the length and position of the nozzle openings 234, the orientation and size of the nozzle openings 234, and the pressure, temperature, and flow rates of the air through the nozzle openings 234.

In the view of FIG. 2, the shield 250 extends from the aft wall structure 220 in a generally straight or partially curved manner along the length of the nozzle 230 and then curves or hooks around the end 232 of the nozzle 230. However, in other exemplary embodiments, the shield 250 may have other configurations based on the considerations discussed above. For example, the shield 250 may be relatively straight or flat and extend down towards the nozzle 230 at an angle to the axial direction, or have compound straight segments to at least partially enclose the nozzle 230. The shield 250 may be attached to the aft wall structure 220 in any suitable manner, including fasteners, welding, or adhesive. In further embodiments, the shield 250 may be formed from the aft wall structure 220 itself, such as with sheet metal bending or forming.

In one exemplary embodiment, the end 252 of the shield 250 is positioned approximately half way or within the inner third along the length of the aft wall 220, although other configurations may be provided. In some embodiments, the axial length of the shield 250 is at least half of the axial length of the chamber 210. In one example, the distances 282, 284 are less than the distance 280 between the nozzle 230 and the inner surface of the inlet lip 126.

As best shown by FIGS. 2 and 3, a number of outlet holes 270 are defined in the inlet lip 126 to enable the air to flow out of the second chamber portion 214. Generally, the holes 270 are serially arranged along the outer periphery of the inlet lip 126, although other arrangements may be possible. The outlet holes 270 can be of any variety of shapes, and any combination of holes. Generally, a certain pressure is desirable inside chamber 210 that is greater than the pressure outside of the chamber 210 so that the anti-icing air exits with some velocity. This allows the hot gas to dissipate and cool into the large mass of air traveling over the nacelle 106. If the air pressure does not get high enough, then the hot gas may possibly exhaust out onto the nacelle 106, thereby causing heat discoloration or distress in the paint or composites of the nacelle. In one example, typical sizing for each hole 270 is approximately 0.250" diameter and located on the inlet lip 126. The number of holes 270 may be calculated based on the area required to achieve the desired exit velocity or internal pressure.

The anti-icing system 150 may be formed by any suitable material. In one exemplary embodiment, the aft wall structure 220 and shield 250 may be formed by a material suitable for higher temperatures, such as titanium, while the inlet lip 126 may be formed by a lighter or cheaper material, such as aluminum, that does not need to be as robust relative to elevated temperatures.

An exemplary resulting flow pattern is depicted by FIG. 7, which is a schematic view of the anti-icing system 150 of FIG. 2 in accordance with an exemplary embodiment. In particular, the view of FIG. 7 depicts an isometric, forward looking perspective of the inlet lip 126, shield 250, and nozzle 230 removed from the remaining portions of the anti-icing system 150. FIG. 7 further includes the streamlines of the heated air 700 as it exits the nozzle 230 and is directed in a tangential direction into an annular flow path through the first chamber portion 212. As the heated air 700 flows through the first chamber portion 212 in a swirling annular path, portions flow through the passage 260 into the second chamber portion 214. However, on average, the air exiting the nozzle 230 will complete one or more revolutions about the engine centerline before exiting chamber portion 212 into chamber portion 214. As such, at least half of the air exiting the nozzle 230 at any given time will complete at least one revolution within the chamber portion 212. In both chamber portions 212, 214, the turbulently flowing heated air 700 mixes with the larger mass of lower velocity and lower temperature air (as the air is cooled by internal surface of the inlet lip 126) and entrains the larger air mass to swirl circularly through the chamber 210. Generally, the heated air 700 mixes with cooler air to keep the air temperature inside chamber portion 212 warm enough for a portion of surface 126 to be to be fully evaporative during steady state icing conditions, although other arrangements are possible. This is generally sufficient to perform the desired anti-icing function in a more evenly distributed and efficient manner. It also makes it possible to evenly heat both the outer and inner portions of surface 126. By avoiding direct impingement of the air 700 onto a surface of the inlet lip 126, the formation of localized elevated temperatures (or hot spots) may be avoided. In one embodiment, the net result may be a reduction in bleed flow required for icing protection compared to a system without the shield 250.

Accordingly, exemplary embodiments discussed above provide improved anti-icing systems and methods. As an example, exemplary embodiments provide a more controlled and efficient use of bleed air for the anti-icing function, especially as compared to conventional systems that merely dump heated air into interior portions of the nacelle. As a further example, exemplary embodiments provide more uniform and effective heating about the circumference of the inlet lip, especially as compared to conventional systems with pipes having numerous piccolo holes, which may result in undesirable hotspots. The swirling rotational flow characteristics provided by the shield enable improved mixing, circulation, and distribution of the injected hot air within the circular leading edge of an engine to prevent ice build-up thereon. Further, such improvements may be achieved with a reduction in cost, complexity, and weight as compared to conventional approaches.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An anti-icing system for an inlet lip annularly extending about a nacelle of an aircraft engine assembly, comprising:
    an interior wall structure at least partially forming an annular anti-icing chamber with an internal surface of the inlet lip;
    an annular shield with a first end coupled to the interior wall structure and a second end extending into the annular anti-icing chamber, the annular shield dividing the annular anti-icing chamber into a first chamber portion and a second chamber portion, the first and second chamber portions being fluidly coupled together by a passage formed between the second end and the internal surface of the inlet lip; and
    a nozzle configured to be coupled to a source of heated air and extending through the interior wall at an inwardly radial position relative to the first end of the annular shield such that the heated air exits the nozzle into the first chamber portion in which the annular shield blocks direct impingement by the heated air on the internal surface of the inlet lip.

2. The anti-icing system of claim 1, wherein the annular shield has an inner surface and an outer surface such that the first chamber portion is formed by the inner surface of the annular shield and the interior wall structure and the second chamber portion is formed by the outer surface of the annular shield and the internal surface of the inlet lip.

3. The anti-icing system of claim 1, wherein the annular anti-icing chamber is a D-shaped chamber.

4. The anti-icing system of claim 1, wherein the nozzle includes a plurality of nozzle openings, including at least a first nozzle opening oriented in a tangential direction.

5. The anti-icing system of claim 4, wherein the plurality of nozzle openings includes a second nozzle opening that is oriented at an angle offset relative to the tangential direction.

6. The anti-icing system of claim 1, wherein the nozzle includes a plurality of nozzle openings, including a first nozzle opening oriented at a first angle of less than 10° relative to a tangential direction, a second nozzle opening oriented at a second angle of between 10° and 30° relative to the tangential direction, and a third nozzle opening oriented at a third angle of greater than 30° relative to the tangential direction.

7. The anti-icing system of claim 1, wherein the annular shield is C-shaped with the second end curving around an end of the nozzle to at least partially enclose the nozzle.

8. The anti-icing system of claim 1, wherein the first chamber portion has a first cross-sectional area and the second chamber portion has a second cross-sectional area, the first cross-sectional area being approximately equal to the second cross-sectional area.

9. The anti-icing system of claim 1, further comprising a plurality of exhaust holes formed about a circumference of the inlet lip.

10. The anti-icing system of claim 1, wherein the interior wall structure and the annular shield are formed from a first material, different from a second material forming the inlet lip.

11. The anti-icing system of claim 1, wherein the annular shield is arranged relative to the nozzle and the interior wall such that the heated air exiting the nozzle completes, on average, at least one revolution around the first chamber portion prior to flowing into the second chamber portion.

12. An engine assembly, comprising:
    an engine;
    a nacelle housing the engine and having a leading portion formed by an inlet lip; and
    an anti-icing system configured to direct air from the engine to the inlet lip for anti-icing the inlet lip, the anti-icing system comprising
        an interior wall structure at least partially forming an annular anti-icing chamber with an internal surface of the inlet lip;
        an annular shield with a first end coupled to the interior wall structure and a second end extending into the annular anti-icing chamber, the annular shield dividing the annular anti-icing chamber into a first chamber portion and a second chamber portion, the first and second chamber portions being fluidly coupled together by a passage formed between the second end and the internal surface of the inlet lip; and a nozzle configured to be coupled to a source of heated air and extending through the interior wall at an inwardly radial position relative to the first end of the annular shield such that the heated air exits the nozzle into the first chamber portion in which the annular shield blocks direct impingement by the heated air on the internal surface of the inlet lip.

13. The engine assembly of claim 12, wherein the annular shield has an inner surface and an outer surface such that the first chamber portion is formed by the inner surface of the annular shield and the interior wall structure and the second chamber portion is formed by the outer surface of the annular shield and the internal surface of the inlet lip.

14. The engine assembly of claim 12, wherein the annular anti-icing chamber is a D-shaped chamber.

15. The engine assembly of claim 12, wherein the nozzle includes a plurality of nozzle openings, including a first nozzle opening oriented at a first angle of less than 10° relative to a tangential direction, a second nozzle opening oriented at a second angle of between 10° and 30° relative to the tangential direction, and a third nozzle opening oriented at a third angle of greater than 30° relative to the tangential direction.

16. The engine assembly of claim 11, wherein the annular shield is C-shaped with the second end curving around an end of the nozzle to at least partially enclose the nozzle.

17. The engine assembly of claim 12, wherein the first chamber portion has a first cross-sectional area and the second chamber portion has a second cross-sectional area, the first cross-sectional area being approximately equal to the second cross-sectional area.

18. The engine assembly of claim 12, further comprising a plurality of exhaust holes formed about a circumference of the inlet lip.

19. The engine assembly of claim 12, wherein the interior wall structure and the annular shield are formed from a first material, different from a second material forming the inlet lip.

20. The engine assembly of claim 12, wherein the annular shield is arranged relative to the nozzle and the interior wall such that the heated air exiting the nozzle completes, on average, at least one revolution, on average, around the first chamber portion prior to flowing into the second chamber portion.

* * * * *